Patented Aug. 22, 1939

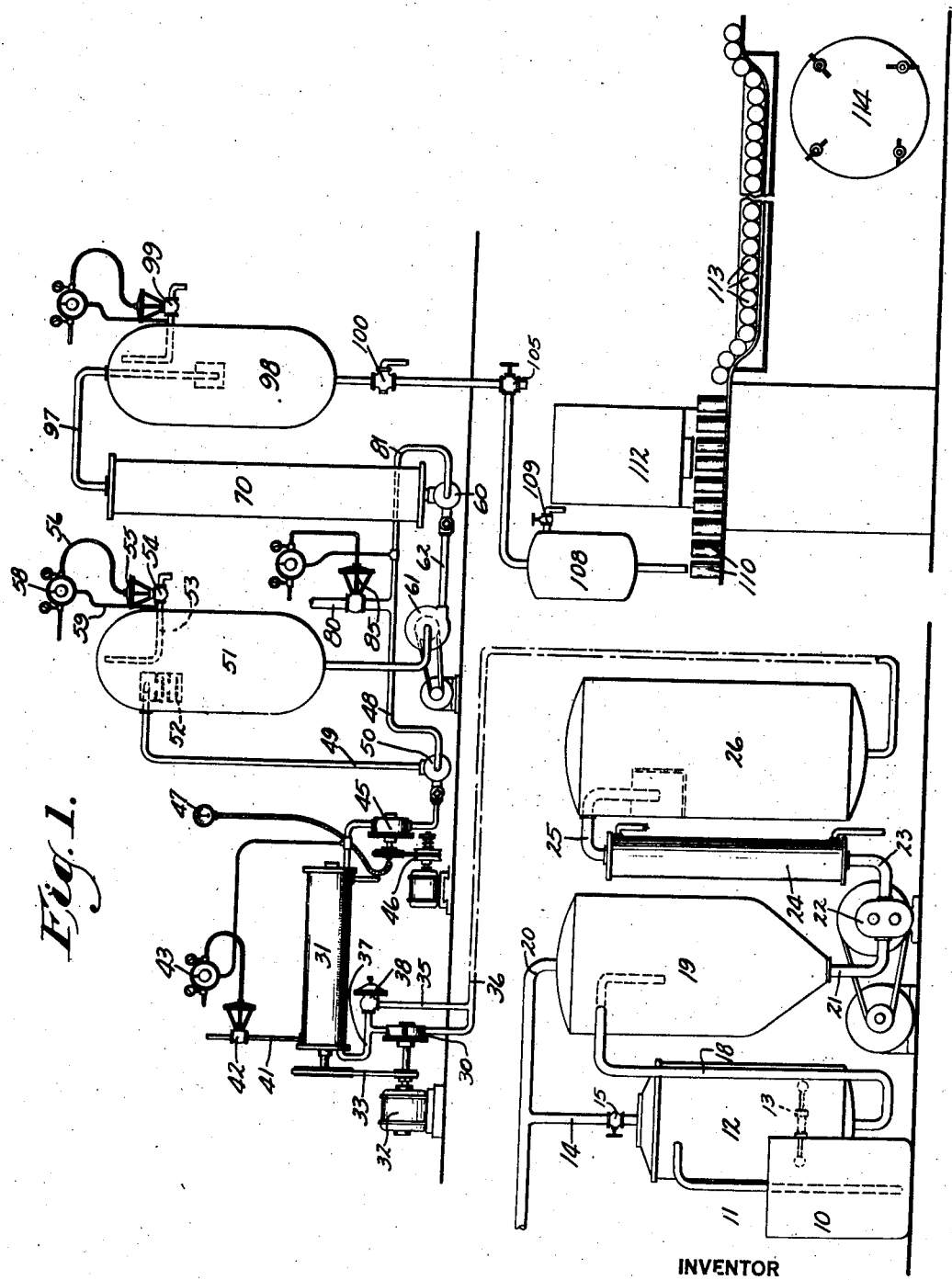

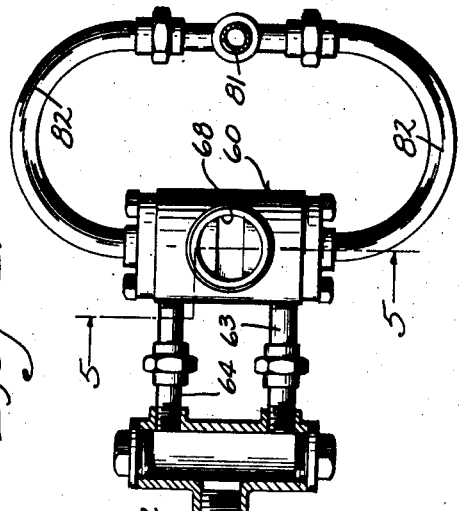

2,170,195

UNITED STATES PATENT OFFICE 2,170,195

STERILIZING APPARATUS

George Grindrod, Oconomowoc, Wis.

Application April 18, 1935, Serial No. 17,012

10 Claims. (Cl. 99—251)

My invention relates to improvements in sterilizing apparatus.

My object is to provide improved sterilizing apparatus peculiarly adapted for the sterilization of food products and other materials subject to deterioration, thermo-chemical change, flavor change, or other critical reactions to high temperatures.

Further and more specific objects are to provide apparatus suitable for carrying out a process of stepped or staged sterilization of the general character described in my companion application bearing even date herewith; to provide improved means for delivering to liquiform materials an unusually intense heat shock of a degree above that heretofore found to be practical in the treatment of foods; to provide means for lowering the death point of living organisms, including highly resistant bacteria and spores, preparatory to administering a final heat shock relied upon to complete their destruction; and to provide means whereby such sterilization may be carried on with such continuity as to permit of continuous packaging, with sufficient certainty of complete sterilization to enable milk, milk products, and similar perishable foods to be packaged, transported, and stored indefinitely without spoilage, or at least with a percentage of loss too small to prevent the marketing of the product with complete commercial success.

My objects include the equipment of sterilizing apparatus with adequate regulatory equipment for delivering liquiform material in a continuous solid stream, devoid of free air, and maintained under mechanical pressure equilibrium with the temperature and pressure of the material while passing through the sterilizer.

A further object is to provide an improved sterilizing column in which the material may be subjected to adiabatically expanding steam without material loss by condensation, and with multiple directional reversals insuring complete distribution of steam within the material and substantially uniform exposure of each particle of material to the desired degree of temperature for a predetermined brief period of time, such as may aptly be referred to as momentary.

In the drawings:

Figure 1 illustrates conventionally a preferred sequence of elements or members of my improved apparatus from the time of preliminary treatment to final packaging and retort sterilization.

Figure 2 is a view, partly in elevation and partly in section, showing a rotary heat exchanger adapted for use in preparing the material for a major heat shock delivered to the material by adiabatically expanding steam.

Figure 3 is an elevational view, partly in vertical section, of a column sterilizer in which the aforesaid major heat shock is delivered.

Figure 4 is a plan view of the base portion of said column sterilizer.

Figure 5 is a sectional view, drawn generally to line 5—5 of Figure 4.

Figure 6 is a sectional view drawn to line 6—6 of Figure 3.

Figure 7 is a detail sectional view of one of the control valves, with an interchangeable capacity determining ported member.

Like parts are identified by the same reference characters throughout the several views. Parts not illustrated in detail or in section may be assumed to be of ordinary construction, insofar as their internal structure and accessories are concerned. For that reason they are illustrated conventionally, a conventional illustration being sufficient to disclose their cooperative relation to the other elements and members of my improved apparatus.

As indicated in Figure 1, the material to be sterilized may be drawn by suction or delivered by any suitable means from a vat 10 through a pipe 11 into a sterilizing chamber 12. This sterilizing chamber may be assumed to correspond with that disclosed in my former Patent Reissue No. 19,193, dated June 5, 1934. In such a chamber, steam may be delivered upwardly into the material through upwardly pointed nozzles 13 mounted in the base or lower portion.

With a sufficient number, and with a distribution of nozzles 13 proportionate to the quantity of material in the chamber, the temperature of the material may be raised from room temperature ranging from approximately 212° F. to 230° F. within one or two minutes. The exact degree of heat to be applied at this stage is not critical and is subject to considerable variation with reference to the nature of the material to be treated. The maximum temperature may be momentary in duration, a few seconds being sufficient.

The steam is permitted to flow through the material and escape through a vent 14 provided with a valve at 15 which controls the temperature and pressure in the manner set forth in said former patent, and also allows a great volume of steam to flow through the material for the described brief period, whereby a heat shock is administered of sufficient severity to destroy less resistant bacteria and impair the vitality of the surviving organisms, including spores. The material may then be delivered by any suitable means, such as the pipe 18, into a vacuum chamber 19, this chamber being maintained under vacuum by suction applied through a pipe 20 connected with the upper portion of the chamber. From the bottom of this vacuum chamber the material is drawn through a pipe 21 into a pump 22 which delivers it through the pipe 23 into a heat interchanging cooler 24 of any ordinary construction, from which the material is delivered through the pipe 25 into a storage chamber 26.

While I have referred to the steam treatment in the chamber 12 as a means for subjecting the material to an initial heat shock, it is to be understood that the major purpose of this initial steam treatment is the stabilization of the material itself against coagulation, and to some extent against fat separation. With some materials it is desirable for the purpose of completing and stabilizing a mixture of different ingredients which would otherwise tend to separate. This treatment may have little effect upon, or be a small factor in, the final destruction of the more highly resistant organisms, but it tends to arrest bacterial action and muliplication, and if desired the temperature may be brought to a stage in which the total number of bacteria will be considerably reduced.

The material thus treated may be allowed to accumulate in the storage chamber, and successive batches may be delivered to the storage chamber from the chamber 12 and held in the storage chamber for several hours without deterioration, or even from one day to the next, although preferably not materially exceeding one full 24-hour day.

The pump 30, preferably a continuous delivery rotary gear type, may be employed to draw the material from the bottom of the storage chamber 26 and deliver it under pressure through a rotary heat exchanger 31. A motor 32 is employed to actuate the pump 30 and drive the rotary member of the heat exchanger 31 through suitable pulleys and a belt 33. The steam in cavity 39 (Figure 2) heats the film of material in annular cavity 40. The steam supply pipe 41 has a valve 42 controlled by pressure regulator 43.

A by-pass 35 connects the inlet pipe 36 of the pump 30 with the outlet pipe 37 leading to the heat exchanger 31, and a suitable pressure regulating relief valve 38 controls deliveries through pipe 35 to pipe 36, whereby to maintain constant pressure in the pipe 37 as predetermined by the setting of the relief valve.

Since the sterilizing procedure hereinafter described may be carried on at temperatures considerably above those developed in the heat exchanger, the material may be under a vapor pressure considerably in excess of that in the heat exchanger 31. Therefore the relief valve 38 is set to maintain a corresponding pressure, independently of the temperature, in the heat exchanger 31.

The metering pump 45 receives the material from the outlet of the heat exchanger 31 and delivers it through heater 50 into a separating chamber 51, from which excess steam and dissolved air may be removed preparatory to a delivery of the material into the sterilizing chamber 60 for administration of the major sterilizing heat shock.

Inasmuch as exact metering is important, the pressure regulating relief valve 38 is depended upon to maintain the pressure at the inlet of the pump 45 in correspondence with the desired temperature and pressure in the sterilizer 60. The pump 45 is provided with variable speed control mechanism indicated at 46 in Figure 1, and it is also provided with a revolution indicator or tachometer 47.

Any pumping mechanism may be employed which is capable of producing a non-pulsating flow without slippage. By employing a rotary gear pump and having the pressures balanced at the inlet and outlet, deliveries may be controlled to within less than one pound per square inch of variation and in a non-pulsating continuous stream.

However, the metered material may pass through the pump 45 at a pressure considerably in excess of its temperature equivalent, and I therefore employ the heater 50 to bring the temperature and pressure into substantial equilibrium by injecting steam from a supply pipe 48 directly into the material passing through the heating chamber 50, which may be assumed to be of a generally cylindrical form having its outlet connected with the separating chamber 51 by a pipe 49. By injecting steam into the moving stream of material in sufficient volume and at a sufficiently high temperature, the temperature of the material may be almost instantly brought into equilibrium with the pressure. However, I prefer to inject a volume of steam slightly in excess of these requirements and deliver the material downwardly in the separating chamber 51 through a non-splashing outlet member 52. From the top of the chamber the excess steam and dissolved air may be released through the pipe 53 and a valve 54, which is automatically controlled by a reversely acting diaphragm pressure regulator 55 of ordinary type which operates to open the valve 54 whenever the pressure in the chamber 51 becomes slightly in excess of the predetermined pressure at which the sterilizer 60 is to operate.

Air under pressure is supplied to the upper side of the diaphragm 55 through a pipe 56 controlled by a valve at 58, which automatically opens under vapor pressure derived from chamber 51 through pipe 59. Such pressure regulator mechanisms being in common use, further description is deemed unnecessary. Any means for controlling the release of excess steam and air from the chamber 51 and maintaining the material in said chamber constantly at the desired temperature and pressure may be employed, if sufficiently instantaneous in operation and adjustment.

The sterilizer 60 is novel in structure and mode of operation. It utilizes steam jets injected directly into the material at a temperature higher than that of the material, and as this tends to set up a pulsation or surge in the supply coming from the chamber 51, I employ a turbine pump 61 and operate it at a speed in excess of requirements and in excess of the supply from chamber 51, that chamber being kept constantly empty or substantially empty. The material falling by gravity from the chamber 51 and entering the pump 61 is instantly driven through the tube 62 into receiving chambers or cavities in the sterilizer 60.

The cubical capacity of the tube 62 or of the fittings connecting the outlet of the turbine pump 61 with the sterilizer is so small that no liquid will be permitted to accumulate in these passages. The temperature will preferably be maintained at the outlet of the sterilizer nozzles hereinafter described at about 260° F., although I may maintain a temperature as high as 280° F.

But inasmuch as the entire system from the outlet of the pump 30 will be maintained at a corresponding pressure, regardless of its temperature, I am able to utilize the turbine pump in the manner above described to prevent the steam jets from developing pulsations.

As above stated, the sterilizer is novel in structure and mode of operation, and I will therefore describe it with particular reference to Figures 3, 4, 5, and 6.

The material is delivered by the turbine pump 31 through the pipe 62 and its branches 63 and 64 (Figure 4), into cavities 65 and 66 (Figure 5), near the ends of the base portion of the sterilizer 60.

Steam is delivered into the cavities 65 and 66 of the base through end ports 73, distributing cavities 74, and sets of expansion nozzles 75. The nozzles 75 are each axially aligned with similarly formed outlet nozzles 76 of larger capacity in the opposite walls of these cavities 65 and 66, whereby the steam and the material which it encounters is driven into a central cavity 67 and upwardly through an outlet 68 into the column 70. Each nozzle 75 is not only paired with a nozzle 76, but these pairs of nozzles are aligned with, and opposed to, corresponding nozzles associated with the cavity 65, whereby the streams of material and steam will be jetted with great force against each other in the cavity 67. The use of opposed nozzles is not essential, but I prefer this arrangement for extreme dispersion and apparently some added sterilizing efficiency.

By using expansion nozzles 75, conically enlarged in the direction of their outlets, I am enabled to develop the kinetic energy of the steam and continue the development of kinetic energy in the nozzles 76. Owing to the high temperature of the material, there is a minimum possible loss of energy, the released energy being converted into superheat. The steam does not condense into the liquid since the liquid is in pressure and temperature equilibrium with the exhaust pressure of the nozzles. Accordingly, substantially all of the energy of the adiabatically expanding steam becomes kinetic energy. The energy converted into superheat produces some evaporation of liquid, and the weight of steam per unit of time which passes upwardly through the column 70 is therefore slightly greater than the weight of the steam admitted to the nozzles.

It will be observed in Figure 1 that a steam supply pipe 80, employed to deliver steam to the heater 50 through the pipe 43, may also be made to serve as the source of supply to the steam ports 73 of the sterilizer 60, this pipe 80 being connected by a pipe 81 and branch pipes 82 (Figure 4) with the sterilizer steam inlet port 73. A diaphragm controlled valve mechanism at 85, similar in construction and operation to that above described for controlling the outlet valve 54 of the chamber 51, may be employed to accurately control and pre-determine the pressure and volume of the steam admitted through the pipe 80.

I have found that in the use of sterilizing apparatus of the type disclosed in Figures 3 to 6, inclusive, the time interval, however short, plays an important part in the sterilization of the product, and that the control of the time interval must be relatively accurate. The opposed adiabatic expansion nozzles above described have been found capable of producing an extreme sterilizing effect within a time interval which may be aptly regarded as immeasurably short.

I regard it as desirable to provide auxiliary means for control of the time interval and for its prolongation, for the following reason.

For many liquiform products I have found it simpler and less expensive to operate at moderate expansion temperatures and pressures in the vicinity of 270° F. than to operate at higher temperatures and pressures, and in order to extend the time interval of exposure to such temperatures and increase the certainty of exposure of every living organism directly to such temperatures or to contacts with particles of steam at such temperatures, I employ auxiliary equipment which I have designated as a plate column, this being the column 70 heretofore referred to.

The wall of the chamber 70 is cylindrical, and within the chamber, I superpose a series of rings or short sleeves 90, the outer surfaces of which fit against the chamber wall. Each of the rings 90 carries a centrally disposed perforate or fragmentary partition 92. In the construction shown, these partitions have a series of apertures 93 (Figure 6), encircling an axially disposed rod 94.

Between the partitions 92, spacing sleeves 95 are mounted upon the rod 94 and each provided with a centrally disposed radially extending flange 96 adapted to serve as a baffle. These flanges 96 extend across the path of material coming through the apertures 93 and deflect such material outwardly until it can pass around the outer margin of the baffle.

The material driven upwardly through this column is violently agitated and its direction of movement constantly reversed.

The material is driven through this column from the bottom to the top and outwardly from the column through the pipe 97 into a reservoir 98. The time interval within the column is therefore determined by several factors, as follows:

The volume of liquid for unit of time.

The volume of steam delivered through the steam nozzles.

The mean cross sectional area of the passage through the column.

The horizontal distances between the alternate plates.

The liquid does not fill the column but tends to cover the upper sides of the horizontal plates to a certain depth dependent upon the relative volumes of liquid and steam, and the velocity of the steam passing upwardly.

As an example of the combination of conditions under which this improved sterilizing unit may be used, it may be assumed that liquid material is being metered at the rate of three gallons per minute and that the steam nozzles are of such size as to deliver one pound of steam for each five pounds of material. The combined liquid and steam will then preferably be discharged into a plate column having sixteen pairs of plate partitions and disk-like baffles so spaced that the vertical distance between the upper face of each plate and the under surface of each disk is 1¾ inches. The total cubical capacity of the column will then approximate 2½ times the volume of the liquid which passes through it during an interval of 30 seconds. Under these conditions the velocity of the steam will be such that it will elevate the liquid but maintain an average depth or layer of material on each partition plate and baffle disk equal to approximately 40% of the total depth of the intervening spaces, the steam occupying approximately 60% of the total available space in the column. Apparently the condition of the liquid is one of violent agitation with a continual spraying upwardly at the margins of the apertures and the outer margins of the baffles. The material is probably carried violently through each aperture and driven against the under surface of the superposed baffle, and by reaction, against the upper surface of the partition through which it was received in that particular space.

In this manner, if complete sterility is not produced in the nozzles and receiving cavity 67, the time interval of exposure to heat may be sufficiently prolonged in the column to increase the sterilizing efficiency. Substantially all particles of the material are subjected to a uniform time interval under the temperature thus predetermined. Measurements of sterilizing efficiency indicate that the mean time interval of flow through the column deviates slightly from the effective time interval for complete sterilization if the number of plates is small, and apparently this loss of efficiency is inversely proportional to the number of the plates.

In sterilizers of this type thus far tested, I have found that when the number of pairs of plates and disks is in excess of ten, a few plates more or less do not indicate any great variation in efficiency, although an increase in efficiency can be detected by most precise methods. The variation is difficult to measure unless variation in the number of plates and disks is considerable.

For equipment requiring absolute sterilization with minimum time of heat exposure, I prefer to use approximately 30 pairs of plates and rings and find that the time interval of exposure to heat and the time interval effective for accomplishing complete sterilization correspond very closely and with sufficient accuracy for commercial purposes in the sterilization of food products containing milk and similar products requiring that the time interval of exposure to heat be kept at a minimum, and also requiring, or at least making desirable, redispersion and stabilization of coagulable material, and stabilization against separation of solids which would otherwise separate.

Since the mean time interval of flow through the column is to a considerable extent dependent upon the ratio of steam to the volume of liquid, it is evident that the pressure of the steam entering the expanding nozzles controls to a certain extent the time interval of exposure, and within certain limits it is practicable to adjust the time interval of flow through the column by regulating this inlet pressure. Other conditions being equal, the higher the inlet pressure the shorter will be the time interval of exposure to heat, although the variation will not bear a numerical ratio. The time interval of exposure in the column probably varies as the cube of the mean velocity of the steam passing through the column. Also, the volume of the steam in the column varies in accordance with the function of its inlet pressure, but not numerically in accordance therewith.

The numerical relationship between the inlet pressure and the time interval in the column is quite complex, and an arbitrary calibration of time interval with respect to inlet pressure for a nozzle of a given size should ordinarily be made for each apparatus, and by this means it will be found practicable to bring about limited variations in the time interval by regulation of inlet pressure.

By such calibration it should be found practicable to construct a column calculated for delivery of material in a continuous stream with a 30-second time interval of exposure to heat in the base and column. After calculating the dimensions of such a column with reasonable accuracy for a given rate of flow with a given nozzle size and inlet pressures, then the time interval may be reduced as low as 20 seconds by increasing the inlet pressure a few pounds per square inch. On the other hand, it will be found practicable to increase the time of exposure to heat by approximately 50% by reducing the inlet pressure. These variations of inlet pressure may be determined by the setting of any ordinary automatic controller.

If greater changes in time interval are desired for a column of the above mentioned type, it will ordinarily be necessary or desirable to reorganize the column as to diameter and spacing of its plates and disks.

From the time of admission to the heat exchanger to the time of delivery from the top of the column will ordinarily require about 40 seconds.

The column sterilizer above described will ordinarily be operated at temperatures considerably in excess of those practicable to employ in other methods of sterilization. Ordinarily commercial sterilization by steam under pressure is accomplished within a temperature range of 240° F. to 250° F., these lower temperatures being necessary in the conventional types of retort sterilization because of the time required to secure penetration of heat and subsequent withdrawal of heat, whereas in my column sterilizer there is no measurable lag of heat penetration and withdrawal. Consequently the time interval may be accurately gauged and sufficiently reduced in duration to permit utilization of these higher temperatures. The rate of destruction of bacterial spores is known to have a logarithmic curve, such that the time interval of exposure to temperature to accomplish a given sterilization becomes extremely short at the higher ranges of temperature available to this column sterilizer.

For example, a given sterilization may be accomplished in 40 minutes by heat penetration to a temperature of 240° F. The same degree of sterilization may be accomplished in three minutes at 260° F., in .85 of a minute at 270° F., in in .65 of a minute at 272° F., and at .22 of a minute at 280° F. Therefore, it is obvious that the cubical capacity of the column may be made very small with reference to the output per hour, whereas if the column were operated at a lower temperature the cubical capacity would require to be greatly increased in order to maintain such output.

But for reasons of economy in the use of steam it is objectionable to employ temperatures much higher than those above mentioned as the working temperatures of my improved sterilizing column. The higher the temperature to which the material is elevated the greater will be the cost of steam to accomplish sterilization, since a greater weight of steam will have to be flowed through the nozzles and the column. Consequently, a compromise working range will ordinarily be adopted which will be represented by a temperature range between 260° F. and 280° F.

The discharge from the column 70 through the pipe 97 will consist of a mixture of steam and entrained material. It is delivered by the pipe 97 into a closed reservoir 98. This reservoir is similar to the separator chamber 51, and ordinary baffles, not illustrated, may of course be employed to facilitate complete separation of the material from the outgoing steam.

This control may be accomplished by a reversely acting exhaust valve mechanism 99 similar to the valve 54 and its controlling diaphragm chamber 55. The setting of the controller of this relief valve determines the back pressure upon the column and therefore the temperature of the material in the column above the receiving cavity 67 at the nozzle outlets.

The material in the chamber 98 drops by gravity and is discharged through a valve 100 which has an orifice of a certain definite size determined by a removable apertured partition plate 101 illustrated in Figure 7. The plate 101 is made removable to allow plates having apertures of differing size to be substituted, whereby the outflow of the material may be made to correspond with the metered inflow, thus preventing an accumulation of any large quantity of material in the chamber 98 and yet preventing the outflow of any material amount of steam. Such a valve is preferable to the float valves ordinarily employed to control deliveries from a receiving chamber, for the reason that it is not dependent upon the character of the material which is being handled, whereas a viscous liquid or a liquid containing entrained solids or granular material could not be controlled by means of a float valve. It is particularly desirable to discharge the material immediately after it enters the receiver 98 in order that it may be cooled as quickly as possible.

An auxiliary valve 105 is preferably provided to permit delivery of waste material or the draining of condensate or cleansing fluid out of the chamber 98 preparatory to a sterilizing operation.

Upon passing through the valve 100 the material is delivered into a receiving chamber or hopper 108 which is maintained at or below atmospheric pressure. The steam which generates because of this reduction in temperature may be released to the atmosphere through a valve 109, and the material delivered from the bottom of the hopper or receiving chamber directly into the packages 110 to be passed through a packaging machine indicated at 112.

From the packaging machine the filled and sealed packages 113 are delivered to a retort sterilizer indicated at 114. Inasmuch as the filling machine, retort sterilizer, and associated parts may be of any ordinary construction, they are herein conventionally illustrated merely for the purpose of explaining my improved apparatus when installed for continuous operation under sterile conditions with provision for re-heating in the retort sterilizer 114 to ensure the destruction of air borne bacteria if any should have infected the material.

In the retort re-heating may be of brief duration and the temperature may be comparatively low. Ordinarily a retort sterilization of ten minutes' duration at a temperature of about 212° to 230° will be sufficient.

If the sterilizer 12 is employed to administer a preliminary heat shock, and if the conditions are such as to eliminate the danger of reinfection during the packaging operations, retort sterilization may be omitted, at least in the treatment of some materials.

Also, it is possible to sterilize certain materials by means of the column sterilizer alone, although I do not recommend complete dependence upon this sterilizer as an independent sterilizing unit if the material to be sterilized contains highly resistant organisms.

Ordinarily the column sterilizer should be used in association with means for predetermining the pressure independently of the temperature, and then accurately metering the material and bringing its temperature into equalization with the pressure preparatory to its delivery into the paths of the steam jets at the base of the column. These preliminary steps should be taken to avoid use of an excessive amount of steam and loss of energy and to avoid at least some probable inescapable reduction in sterilizing efficiency.

In the drawings and the foregoing description I have disclosed my invention in its preferred form as employed for the sterilization of food compounds containing vegetable material and milk or milk products. I believe the particular products so produced are novel and incapable of production by any sterilizing equipment heretofore known, since the temperature and time factors applicable to ensure complete sterilization of such vegetable material have heretofore been found to be destructive of milk and milk compounds.

But while I have disclosed apparatus designed for meeting these extreme conditions, it should not be understood that all of the disclosed equipment is necessary for the complete destruction of less highly resistant bacteria or for the destruction of the most highly resistant bacteria when the materials treated can withstand higher or more prolonged temperatures.

Also, the degree of sterilization required for commercial production and marketing of any given material will vary greatly with differences in materials, differences in products, and differences in storing and marketing methods.

Therefore, my invention is subject to an unusually wide range of modification with reference to the nature of the operation and the character and quality of the material to be treated, and other conditions typefied in the foregoing enumeration.

In the construction illustrated, all parts of the apparatus from the pump 30 to the chamber 98, inclusive, may be regarded as one sterilizer or sterilizing unit, and the time for any given particle or portion of the material to travel from the pump 30 through the column 70 may be so short as to be aptly referred to as "momentary" by comparison with ordinary methods of sterilization, requiring from 20 to 90 minutes. However, the sterilizer 60 with its column 70 may be used either independently or in association with any other means for pre-heating the material and delivering it across the path or paths of one or more steam jets and through the column 70. This would be within the range of my invention. The character of the material and the degree of sterilization required will very largely determine the desirability of employing the pre-heating accessories, pumping mechanism, and devices for avoiding pulsations, such as are desirable to use in association with the column sterilizer when extreme accuracy in the degree of heat, the length of time, and degree of sterility attained, are important or when the material contains highly resistant organisms which it is necessary to exterminate.

It will also be understood that in the foregoing specification the terms "complete sterility" and "complete destruction" of living organisms may have variable significance as applied to different materials and different products. Therefore, in its entirety the apparatus illustrated is to be understood as designed for the purpose of meeting extreme requirements, and that for less drastic requirements the novel features of the apparatus may be used independently, in combinations, and sub-combinations designed in each case for the particular purpose in view.

The apparatus herein described and claimed is in part designed for the purpose of aiding the practice of a new method of sterilization, involving two or more definite heat shocks with an intermediate dwell or period of lowered temperature of a duration calculated to permit certain reactions to occur, whereby the death point of such organisms as survive a preceding heat shock may be sufficiently reduced to cause them to succumb to a later shock of either a greater or less intensity.

However, for many purposes, the apparatus herein disclosed is capable of independent use in whole or in part, and particularly the sterilizing unit which includes the plate column is capable of being used independently of the other parts of the mechanism, and independently of any method of stepped or staged sterilization. For these reasons the method is not herein claimed the method being made the subject of a separate application, Serial No. 59,221, filed January 15, 1936, for Sterile food products and processes of manufacturing such products.

For liquiform materials containing milk or other materials subject to thermo-chemical and flavor change, the various elements of my improved apparatus cooperate to enable me to not only obtain exact regulation of the time and temperature factors, but to produce stabilized products with natural flavors and their characteristics substantially unchanged. By this means I have made it possible to produce completely sterile canned food products from mixtures of milk and fresh vegetables, including peas, beans, spinach, onions, carrots and asparagus, such products retaining substantially the natural characteristics of freshly prepared soups made from the same ingredients. Such canned foods are an entirely new commercial product.

I claim:

1. Sterilizing apparatus including a sterilizing chamber provided with means for continuously delivering material thereto in a non-pulsating stream, associated means for heating the material to a desired sterilizing temperature and removing air therefrom immediately prior to its delivery to said chamber, expander nozzles having walls exposed to the heat of the material, said nozzles being connected to deliver steam into the inlet portion of said chamber to drive the material through said chamber by kinetic energy, said chamber being formed and adapted to deliver all particles of the material therethrough in a turbulent stream within substantially the same predetermined period of time.

2. Sterilizing apparatus including a sterilizing chamber provided with means for continuously delivering material thereto, associated means for heating the material to a desired sterilizing temperature and removing air therefrom immediately prior to its delivery to said chamber, expander nozzles having walls exposed to the heat of the material, said nozzles being adapted for adiabatically expanding steam to develop its kinetic energy without condensation, said nozzles being also connected and adapted to deliver such steam into said chamber at the temperature of the material therein to drive such material through the chamber, said chamber being elongated and provided with direction changing and mixing obstructions and having its cross sectional dimensions so proportioned to the volume of material and steam delivered thereto as to substantially maintain a uniform rate of flow for all of the particles.

3. Sterilizing apparatus including a sterilizing chamber provided with means for continuously delivering material thereto and associated means for heating the material to a desired sterilizing temperature immediately prior to its delivery to said chamber, means for delivering adiabatically expanded steam into said material at the inlet end of said chamber at the temperature of the material, said nozzles being formed and adapted to develop the sufficient kinetic energy to drive such material through the chamber at a predetermined rate, said chamber being proportioned in cross sectional capacity to the volume of the material and steam delivered thereto, whereby expansion and condensation within the chamber may be avoided.

4. The combination of means for heating a confined continuously flowing stream of material to a sterilizing temperature, means for releasing air and sufficient steam therefrom to predetermine such temperature, an elongated sterilizing chamber having an inlet connected to receive said stream of material immediately after passing said temperature predetermining means, and steam jet nozzles subject to corresponding heat and adapted for delivery of steam into the material at the temperature thereof, said sterilizer being formed to provide a passage for the material and steam so proportioned in cross sectional dimension as to maintain a continuous rate of flow and substantially accurate and uniform timing of the interval of exposure of each particle to the heat of the steam.

5. The combination of means for heating a confined continuously flowing stream of material to a sterilizing temperature, means for releasing air and sufficient steam therefrom to predetermine such temperature, an elongated sterilizing chamber having an inlet connected to receive said stream of material from said air releasing and temperature predetermining means, and steam jet nozzles provided with means for subjecting them to corresponding heat and adapted for delivery of steam into the material at the temperature thereof and at the inlet portion of said chamber, said sterilizer being formed to provide a passage for the material and steam so proportioned in cross sectional dimension as to maintain a continuous rate of flow and substantially accurate and uniform timing of the interval of exposure of each particle to the heat of the steam.

6. A high temperature sterilizer for momentary and uniform heat treatment of a continuously flowing confined stream of material, including the combination of a sterilizing chamber having a passage so proportioned in capacity as to permit uniformity in rate of flow for all portions of the material, means for preheating the material and forcing it into said chamber in a non-pulsating stream of the same temperature as that maintained in the sterilizer, and steam supply expander nozzles adapted for adiabatically expanding steam to develop its kinetic energy, connected to deliver such steam into the material adjacent the inlet end of said chamber.

7. Sterilizing apparatus including a columnar sterilizing chamber provided with means for continuously delivering material to the lower end thereof, associated means for heating the material to a desired sterilizing temperature immediately prior to its delivery to said chamber, means for delivering adiabatically expanded steam into said material at the inlet end of said chamber substantially at the temperature of the material and with sufficient kinetic energy to drive the material through said chamber at a predetermined rate of speed, said chamber being provided with direction changing obstructions and forming a passage having a capacity of approximately two and one-half times the cross sectional dimensions of the stream of material entering said chamber, and said steam nozzles having a proportionate capacity adapted to drive all particles of material through the chamber at substantially the same rate of speed, whereby timing of the particles in said chamber may be predetermined with a high degree of precision and the material delivered through said chamber at a rate permitting maintenance of temperatures of about 260 degrees F. or above without material thermochemical or flavor change.

8. The combination with a closed passageway and a tubular sterilizing column having its base portion connected to receive liquid from said passageway, of means for delivering material from said passageway into the chamber in a continuous non-pulsating stream, means for injecting steam into the material preparatory to its entry into the chamber and in a volume sufficient to instantly raise its temperature to a desired sterilizing temperature, and nozzles for injecting steam into the inlet portion of said chamber, said nozzles being subject to the heat of the material and formed to develop the kinetic energy of the steam to drive the material through said chamber, said passage and chamber being proportioned for maintenance of a solid continuously flowing stream of material, whereby all of the particles may be exposed to heat for a precise period of time predetermined by the form of the nozzles and their capability of developing kinetic energy and the length of the passage through said sterilizing chamber.

9. The combination with a closed passageway and a tubular sterilizing column having its base portion connected to receive liquid from said passageway, of means for delivering material from said passageway into the chamber in a continuous non-pulsating stream, means for injecting steam into the material preparatory to its entry into the chamber and in a volume sufficient to instantly raise its temperature to a desired sterilizing temperature, and nozzles for injecting steam into the inlet portion of said chamber, said nozzles being subject to the heat of the material and formed to develop the kinetic energy of the steam to drive the material through said chamber, said passage and chamber being proportioned for maintenance of a solid continuously flowing stream of material, whereby all of the particles may be exposed to heat for a precise period of time predetermined by the form of the nozzles and their capability of developing kinetic energy and the length of the passage through said sterilizing chamber, said chamber being formed to maintain directional changes and turbulence in the material during its passage therethrough.

10. In a sterilizing apparatus of the described class, a columnar sterilizing chamber in combination with a pump adapted to deliver material to the lower end of said chamber in a continuous non-pulsating stream, means for raising the temperature of said stream to a predetermined sterilizing temperature, and means for delivering a regulated volume of steam into such material at the base of said chamber and with sufficient kinetic energy to drive all particles of material through the chamber at substantially the same speed, said chamber and its connections being proportioned in capacity and adapted for delivery of a solid air-free stream of material therethrough, whereby its temperature and the time for exposure of the particles to heat may be accurately predetermined.

GEORGE GRINDROD.